(12) United States Patent
Lee et al.

(10) Patent No.: US 12,469,443 B2
(45) Date of Patent: Nov. 11, 2025

(54) DISPLAY DEVICE

(71) Applicant: Samsung Display Co., Ltd., Yongin-Si (KR)

(72) Inventors: Bo Hwan Lee, Yongin-si (KR); Sang Hun Park, Yongin-si (KR); Yong Sub So, Yongin-si (KR); Da Eun Yi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/624,412

(22) Filed: Apr. 2, 2024

(65) Prior Publication Data

US 2025/0061850 A1  Feb. 20, 2025

(30) Foreign Application Priority Data

Aug. 18, 2023  (KR) .................. 10-2023-0108422

(51) Int. Cl.
*G09G 3/3225* (2016.01)
*G06F 3/041* (2006.01)
*G06F 3/044* (2006.01)

(52) U.S. Cl.
CPC ....... *G09G 3/3225* (2013.01); *G06F 3/04164* (2019.05); *G06F 3/0443* (2019.05); *G06F 3/0446* (2019.05); *G09G 2300/0819* (2013.01); *G09G 2300/0842* (2013.01); *G09G 2310/08* (2013.01); *G09G 2320/02* (2013.01); *G09G 2330/028* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,159,266 B2 * | 10/2015 | Kim | G09G 3/3233 |
| 10,424,251 B2 * | 9/2019 | Song | G09G 3/3258 |
| 2009/0128511 A1 * | 5/2009 | Sinclair | G06F 3/0202 |
| | | | 345/174 |
| 2021/0216168 A1 * | 7/2021 | Kremin | G06F 1/1626 |
| 2024/0079414 A1 * | 3/2024 | Seo | H01L 25/167 |

FOREIGN PATENT DOCUMENTS

| | | | | |
|---|---|---|---|---|
| CN | 111177804 A | * | 5/2020 | ............ G06F 21/74 |
| KR | 10-1140165 B1 | | 4/2012 | |

* cited by examiner

*Primary Examiner* — Duane N Taylor, Jr.
(74) *Attorney, Agent, or Firm* — Innovation Counsel LLP

(57) ABSTRACT

A display device includes a display unit including a plurality of pixels connected to an initialization line and a first power source line, a sensor unit provided on the display unit and including a plurality of driving electrodes, a sensor driver providing a touch driving voltage to a plurality of driving lines connected to the plurality of driving electrodes, a power supply providing an initialization voltage to the initialization line and providing a first power source voltage to the first power source line, and a compensation circuit compensating for the initialization voltage.

16 Claims, 9 Drawing Sheets

SL: GWL, GIL, GBL

DISPLAY DEVICE

CROSS-REFERENCE TO RELATED APPLICATION

This application claims priority to and the benefit of Korean Patent Application No. 10-2023-0108422, filed Aug. 18, 2023, which is hereby incorporated by reference.

BACKGROUND

1. Technical Field

One or more embodiments described herein relate to a display device.

2. Related Art

As information technology develops, the importance of a display device as a connection medium between a user and information is being emphasized. In response to this, the use of display devices such as a liquid crystal display device and an organic light emitting display device is increasing.

A display device includes a display panel and various input devices for displaying an image. Also, the display device may include a touch sensor for sensing a touch input. Accordingly, the display device may operate in display driving to display an image and touch driving to sense a touch input.

SUMMARY

Embodiments provide a display device which prevents deterioration of image quality due to the effect of touch driving on display driving.

In accordance with one embodiment of the present disclosure, a display device may include: a display unit including a plurality of pixels connected to an initialization line and a first power source line; a sensor unit provided on the display unit and including a plurality of driving electrodes; a sensor driver providing a touch driving voltage to a plurality of driving lines connected to the plurality of driving electrodes; a power supply providing an initialization voltage to the initialization line and providing a first power source voltage to the first power source line; and a compensation circuit compensating for the initialization voltage.

The compensation circuit may change the initialization voltage in response to a change in the first power source voltage.

The compensation circuit may be connected between the plurality of driving lines and the initialization line.

The compensation circuit may include a resistor and a compensation capacitor connected in series.

A capacitance of the compensation capacitor may be the same as a capacitance of a capacitor formed between the plurality of driving lines and the first power source line.

The initialization voltage may be changed based on an amount of charge corresponding to a product of the capacitance of the compensation capacitor and the touch driving voltage.

The amount of change in the initialization voltage may be the same as the amount of change in the first power source voltage.

Each of the plurality of pixels may include a first transistor including a gate electrode connected to a first node, a first electrode connected to a second node, and a second electrode connected to a third node; a second transistor including a gate electrode connected to a first scan line, a first electrode connected to a data line, and a second electrode connected to the second node; a third transistor including a gate electrode connected to the first scan line, a first electrode connected to the first node, and a second electrode connected to the third node; a fourth transistor including a gate electrode connected to a second scan line, a first electrode connected to a fourth node that is the initialization line, and a second electrode connected to the first node; a fifth transistor including a gate electrode connected to an emission control line, a first electrode connected to a second power source line, and a second electrode connected to the second node; a sixth transistor including a gate electrode connected to the emission control line, a first electrode connected to the third node, and a second electrode connected to a fifth node; a seventh transistor including a gate electrode connected to a third scan line, a first electrode connected to the initialization line, and a second electrode connected to the fifth node; and a light emitting element including an anode electrode connected to the fifth node and a cathode electrode connected to the first power source line.

The anode electrode is initialized to a compensated initialization voltage in response to the seventh transistor being turned on.

The sensor unit may further include a plurality of sensing electrodes, and the sensor driver may receive a sensing voltage from a plurality of sensing lines connected to the plurality of sensing electrodes.

In accordance with one embodiment of the present disclosure, a display device operating in a display driving period and a touch driving period overlapping with at least a portion of the display driving period may include: a plurality of driving lines connected to a plurality of driving electrodes; a first power source line connected to a cathode electrode of a light emitting element; an initialization line providing an initialization voltage to an anode electrode of the light emitting element; and a compensation circuit connected between the plurality of driving lines and the initialization line.

The compensation circuit may include a resistor and a compensation capacitor connected in series.

A capacitance of the compensation capacitor may be the same as a capacitance of a capacitor formed between the plurality of driving lines and the first power source line.

The compensation circuit may change the initialization voltage based on a touch driving voltage provided to the plurality of driving lines during the touch driving period.

The initialization voltage may be changed by an amount of charge corresponding to a product of the capacitance of the compensation capacitor and the touch driving voltage.

The amount of change in the initialization voltage may be the same as the amount of change in a first power source voltage provided to the first power source line.

BRIEF DESCRIPTION OF THE DRAWINGS

The above and other features of embodiments of the present disclosure will become more apparent by describing in further detail embodiments thereof with reference to the accompanying drawings, in which.

DETAILED DESCRIPTION OF THE ILLUSTRATED EMBODIMENTS

Figure 1:
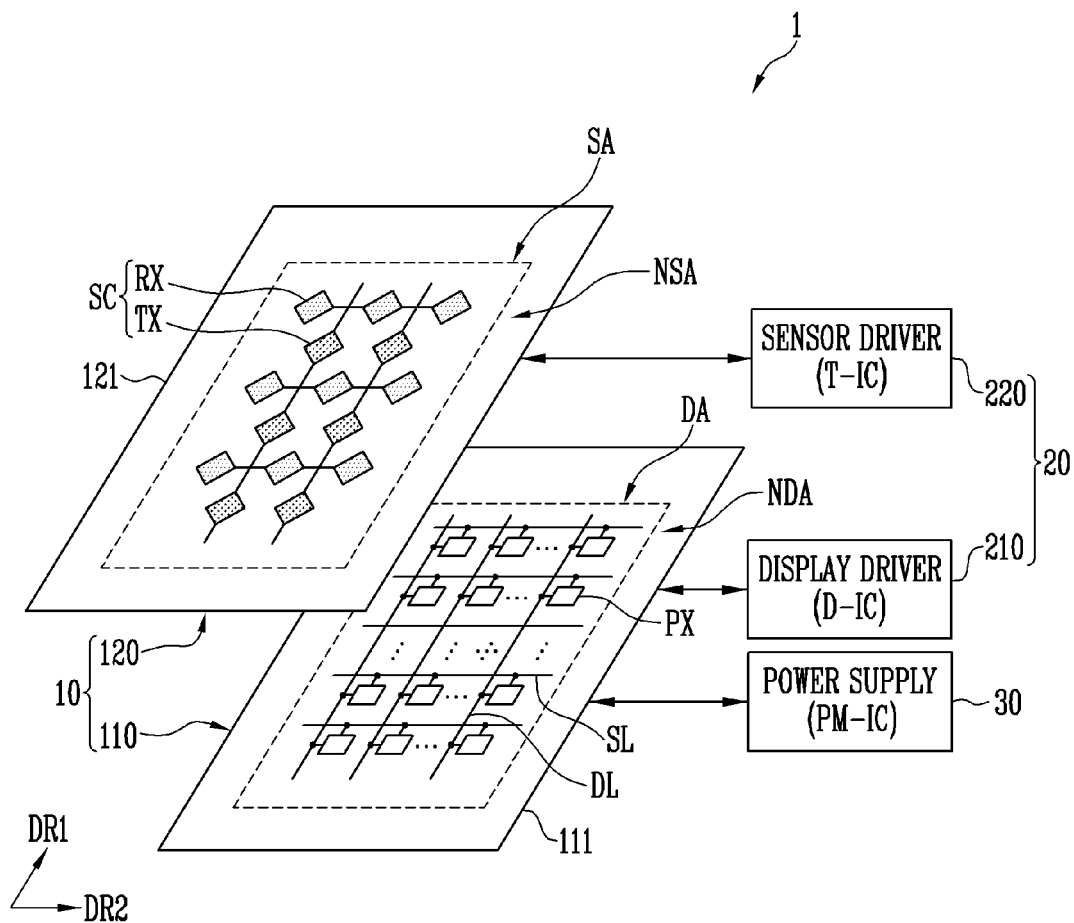
FIG. 1 is a diagram illustrating a display device according to an embodiment.

The disclosure now will be described more fully hereinafter with reference to the accompanying drawings, in which various embodiments are shown. The concepts of the disclosure may, however, be embodied in many different forms, and should not be construed as limited to the embodiments set forth herein. Rather, these embodiments are provided so that this disclosure will be thorough and complete, and will fully convey the scope of the disclosure to those skilled in the art.

In describing the drawings, like reference numerals have been used for like elements. In the accompanying drawings, the dimensions of the structures are enlarged than the actual size in order to clearly explain the disclosure. It will be understood that, although the terms "first", "second", etc. may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the following description, when a first part is "connected" to a second part, this includes not only the case where the first part is directly connected to the second part, but also the case where a third part is interposed between the first part and the second part and they are connected to each other through the third part.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompass both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described in detail with reference to the accompanying drawings.

FIG. 1 is a diagram illustrating a display device according to an embodiment.

Referring to FIG. 1, a display device 1 may include a panel 10, a driving circuit unit 20, and a power supply 30.

The display device 1 may be a device that is activated according to an electrical signal to display an image and sense a touch input. That is, the display device 1 may operate in a display driving mode that displays an image and a touch driving mode that senses a touch input. The display device 1 may be used as a display screen for portable electronic devices such as a mobile phone, a smart phone, a tablet personal computer (PC), a mobile communication terminal, an electronic notebook, an e-book, a portable multimedia player (PMP), a navigation, an ultra mobile PC (UMPC). In addition, the display device 1 may be used as a display screen for various products such as television, a laptop, a monitor, a billboard, and Internet of Things (IOT).

The panel 10 may include a display unit 110 for displaying an image. Also, the panel 10 may include a sensor unit 120 for sensing touch, pressure, fingerprint, hovering, or the like. For example, the panel 10 may include a plurality of pixels PX and a plurality of sensors SC positioned to overlap at least some of the plurality of pixels PX.

The driving circuit unit 20 may include a display driver 210 for driving the display unit 110 and a sensor driver 220 for driving the sensor unit 120. The plurality of pixels PX may display an image in units of display frames when the display device 1 operates in the display driving mode. When the display device 1 operates in the touch driving mode, the plurality of sensors SC may sense a touch input by a user or the like in units of sensing frames. The display frame and the sensing frame may be the same or different from each other.

The display unit 110 and the sensor unit 120 may be manufactured separately from each other and then arranged so that at least one area overlaps each other. However, the present disclosure is not limited thereto, and the display unit 110 and sensor unit 120 may be manufactured integrally.

The sensor unit 120 may be disposed on the display unit 110. For example, the sensor unit 120 may be disposed on the front of the display unit 110, that is, on an upper surface where an image is displayed. However, the present disclosure is not limited thereto, and the sensor unit 120 may be disposed on the back or front and back of the display unit 110, or may be disposed on an edge area of at least one side of the display unit 110.

The display unit 110 may include a display substrate 111 and the plurality of pixels PX formed on the display substrate 111. The plurality of pixels PX may be disposed in a display area DA of the display substrate 111.

The display substrate 111 may include the display area DA where an image is displayed, and a non-display area NDA that is outside the display area DA. For example, the display area DA may be disposed in a central area of the display unit 110, and the non-display area NDA may be disposed in an edge area of the display unit 110 surrounding the display area DA.

The display substrate 111 may be a rigid substrate or a flexible substrate. For example, the display substrate 111 may be a rigid substrate made of glass or tempered glass, or a flexible substrate made of a thin film made of plastic or metal.

A plurality of scan lines SL, a plurality of data lines DL, and the plurality of pixels PX connected to corresponding scan lines SL and data lines DL may be disposed in the display area DA. Each of the plurality of pixels PX may be activated by a scan signal having a turn-on level supplied from a corresponding scan line SL and may emit light with a luminance corresponding to a data signal supplied from a corresponding data line DL. Accordingly, an image corresponding to the data signal may be displayed in the display area DA.

Various lines and/or built-in circuit units connected to the plurality of pixels PX of the display area DA may be disposed in the non-display area NDA. For example, a plurality of lines for supplying various power sources and control signals to the display area DA may be disposed in the non-display area NDA.

The type of the display unit 110 is not particularly limited. For example, the display unit 110 may be implemented as a self-emitting light type display panel such as an organic light emitting display panel. However, when the display unit 110 is implemented as a self-emitting light type display panel, each of the plurality of pixels PX is not limited to a structure that includes only an organic light emitting element. For example, a light emitting element of each of the plurality of pixels PX may be composed of an organic light emitting diode, an inorganic light emitting diode, a quantum dot/well light emitting diode, or the like. In addition, a plurality of light emitting elements may be provided in each of the plurality of pixels PX. In this case, the plurality of light emitting elements may be connected in series, in parallel, or in series and parallel. In addition, the display unit 110 may be implemented as a non-emitting light type display panel such as a liquid crystal display panel. When the display unit 110 is implemented as a non-emitting light type display panel, the display device 1 may further include a light source such as a backlight unit.

The sensor unit 120 may include a sensor substrate 121 and the plurality of sensors SC formed on the sensor substrate 121. The plurality of sensors SC may be disposed in a sensing area SA on the sensor substrate 121.

The sensor substrate 121 may include a sensing area SA capable of sensing a touch input or the like, and a non-sensing area NSA outside the sensing area SA. The sensing area SA may be disposed to overlap at least one area of the display area DA. For example, the sensing area SA may be set as an area overlapping with the display area DA, and the non-sensing area NSA may be set as an area overlapping with the non-display area NDA. In this case, when a touch input or the like is provided on the display area DA, the touch input may be detected through the sensor unit 120.

The sensor substrate 121 may be a rigid substrate or a flexible substrate. For example, the sensor substrate 121 may be a rigid substrate made of glass or tempered glass, or a flexible substrate made of a thin film made of plastic or metal. In addition, the sensor substrate 121 may be composed of at least one insulating layer. For example, at least one substrate constituting the display unit 110 (for example, the display substrate 111, an encapsulation substrate, or the like) or at least one insulating layer or functional layer disposed inside and/or outside the display unit 110 may be used as the sensor substrate 121. In addition, the sensor substrate 121 may be a transparent substrate or a translucent substrate.

The sensing area SA may be an area (that is, an active area) that can respond to a touch input. To this end, the plurality of sensors SC for sensing the touch input or the like may be disposed in the sensing area SA. According to an embodiment, the plurality of sensors SC may include a plurality of first sensors TX and a plurality of second sensors RX. A first sensor TX may be referred to as a driving electrode, and a second sensor RX may be referred to as a sensing electrode.

The plurality of first sensors TX may be connected to each other through a plurality of first bridges. The plurality of first bridges may be integrally formed on the same layer as the plurality of first sensors TX or may be formed on a different layer from the plurality of first sensors TX to electrically connect adjacent first sensors TX to each other. In FIG. 1, the plurality of first sensors TX are shown in diamond shapes, but may be configured in various shapes such as a circle, square, triangle, or mesh form.

The plurality of second sensors RX may be connected to each other through a plurality of second bridges. The plurality of second bridges may be integrally formed on the same layer as the plurality of second sensors RX or may be formed on a different layer from the plurality of second sensors RX to electrically connect adjacent second sensors RX. In FIG. 1, the plurality of second sensors RX are shown in a diamond shape, but may be configured in various shapes such as a circle, square, triangle, or mesh form.

Meanwhile, FIG. 1 shows an example where the plurality of first sensors TX and the plurality of second sensors RX are arranged to intersect each other. However, the arrangement of the plurality of first sensors TX and the plurality of second sensors RX is not particularly limited.

The plurality of first sensors TX and the plurality of second sensors RX may have conductivity by including a metal material, a transparent conductive material, or the like. For example, the plurality of first sensors TX and the plurality of second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and an alloy thereof. In addition, the plurality of first sensors TX and the plurality of second sensors RX may include at least one of various transparent conductive materials including silver nanowires (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide (SnO$_2$), carbon nano tube, and graphene. In addition, the plurality of first sensors TX and the plurality of second sensors RX may have conductivity by including at least one of various conductive materials.

The driving circuit unit 20 may include the display driver 210 for driving the display unit 110 and the sensor driver 220 for driving the sensor unit 120. The display driver 210 and the sensor driver 220 may be configured as separate integrated circuits. However, the present disclosure is not limited thereto, and at least portions of the display driver 210 and the sensor driver 220 may be implemented in one integrated circuit.

The display driver 210 may be electrically connected to the display unit 110 to drive the plurality of pixels PX. For example, the display driver 210 may include a scan driver that supplies the scan signal to the plurality of scan lines SL, a data driver that supplies the data signal to the plurality of data lines DL, and a timing controller that controls the scan driver and the data driver. In addition, the display driver 210 may further include an emission controller that supplies an emission control signal to a plurality of emission control lines EML (see FIG. 7) connected to the plurality of pixels PX.

The sensor driver 220 may be electrically connected to the sensor unit 120 to drive the sensor unit 120. For example, the sensor driver 220 may supply a touch driving signal for driving the sensor unit 120 to the sensor unit 120, and receive a touch sensing signal according to the touch input by the user or the like from the sensor unit 120.

The power supply 30 may be electrically connected to the display unit 110 to drive the display unit 110. For example, the power supply 30 may supply a display driving signal for driving the display unit 110 to the display unit 110. In addition, the power supply 30 may supply an initialization signal for initializing the anode electrode of the light emitting element included in each of the plurality of pixels PX to the display unit 110. The power supply 30 may be configured in the form of an integrated circuit.

Figure 2:
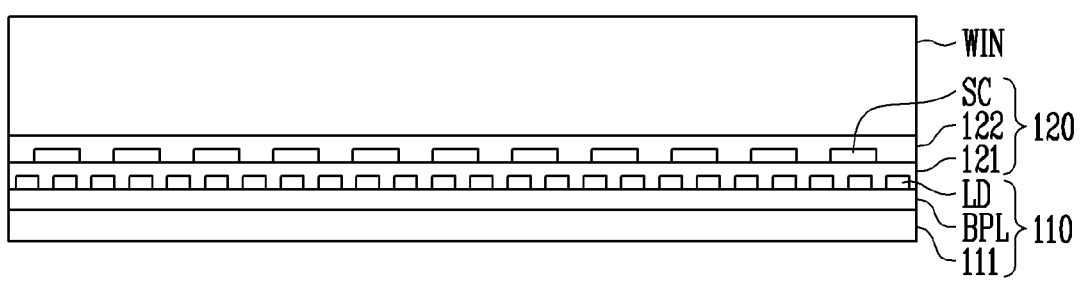
FIG. 2 is a diagram illustrating an example of a stacked structure of the display device.

FIG. 2 is a diagram illustrating an example of a stacked structure of the display device.

Referring to FIG. 2, the sensor unit 120 may be stacked on the display unit 110, and a window WIN may be stacked on the sensor unit 120. That is, the display unit 110 and the sensor unit 120 may be stacked adjacent to each other.

The display unit 110 may include the display substrate 111, a circuit element layer BPL formed on the display substrate 111, and a plurality of light emitting elements LD formed on the circuit element layer BPL. The circuit element layer BPL may include circuit elements (for example, transistors and capacitors) for driving the plurality of light emitting elements LD. In addition, the circuit element layer BPL may further include the plurality of scan lines SL, the plurality of data lines DL, and the like (see FIG. 1).

The sensor unit 120 may include the sensor substrate 121, the plurality of sensors SC formed on the sensor substrate 121, and a protective layer 122 covering the plurality of sensors SC. The sensor substrate 121 may be configured in the form of an encapsulation layer that covers the plurality of light emitting elements LD. However, the present disclosure is not limited thereto, and the sensor substrate 121 may be provided separately from the encapsulation layer that covers the plurality of light emitting elements LD.

The window WIN may be a protective member disposed at the top of a module constituting the display device 1, and may be a substantially transparent substrate. The window WIN may have a multi-layer structure selected from glass substrate, plastic film, and plastic substrate. The window WIN may include a rigid substrate or a flexible substrate.

Although not shown in FIG. 2, the display device 1 may further include a polarizer (or other type of anti-reflection layer) disposed between the window WIN and the sensor unit 120 to prevent reflection of external light.

Figure 3:
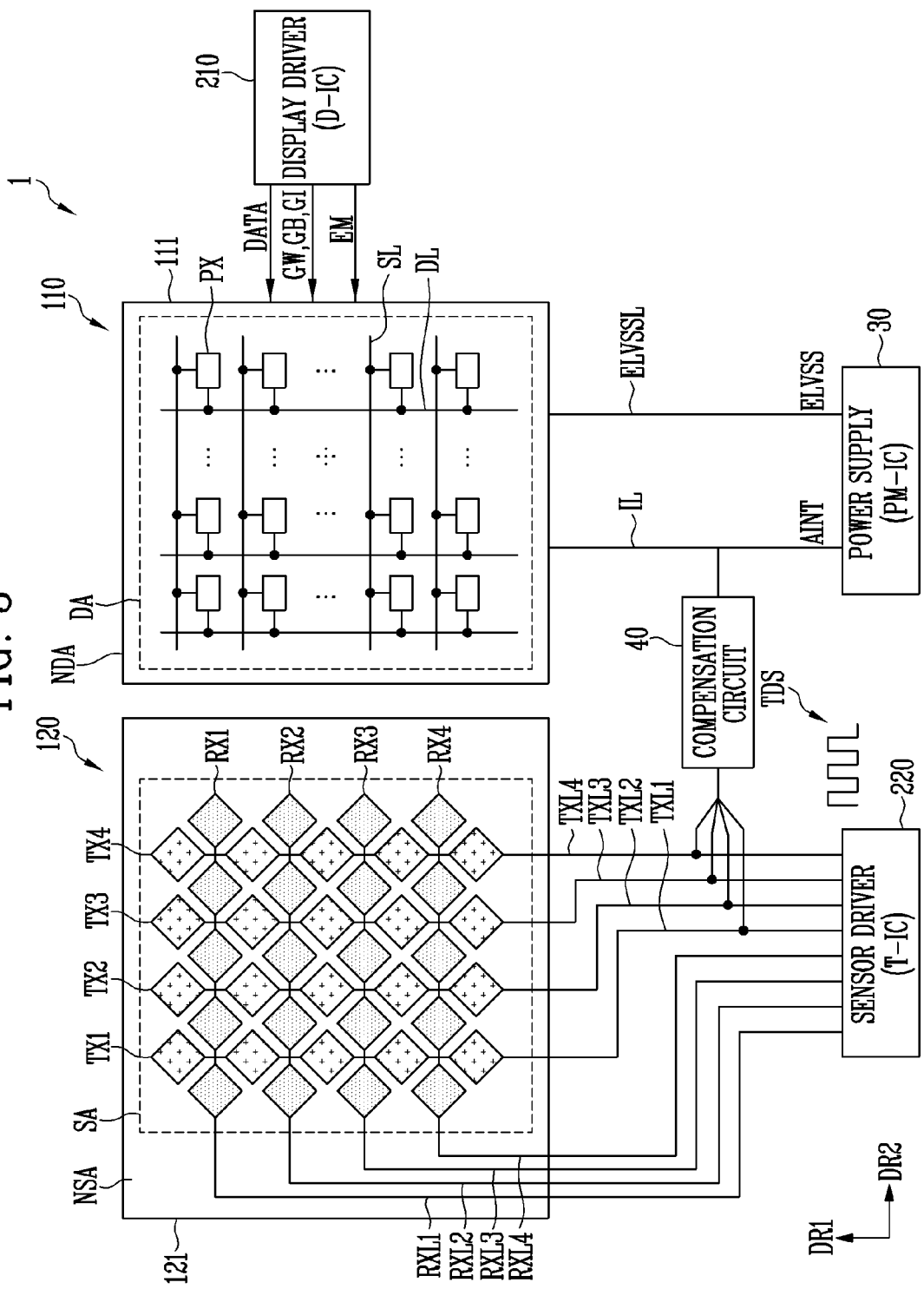
FIG. 3 is a diagram illustrating a display device according to an embodiment.
Figure 4:
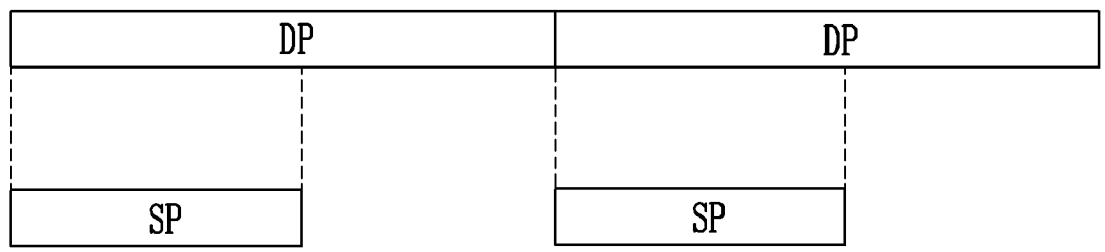
FIG. 4 is a diagram illustrating a display driving period and a touch driving period according to an embodiment.
Figure 5:
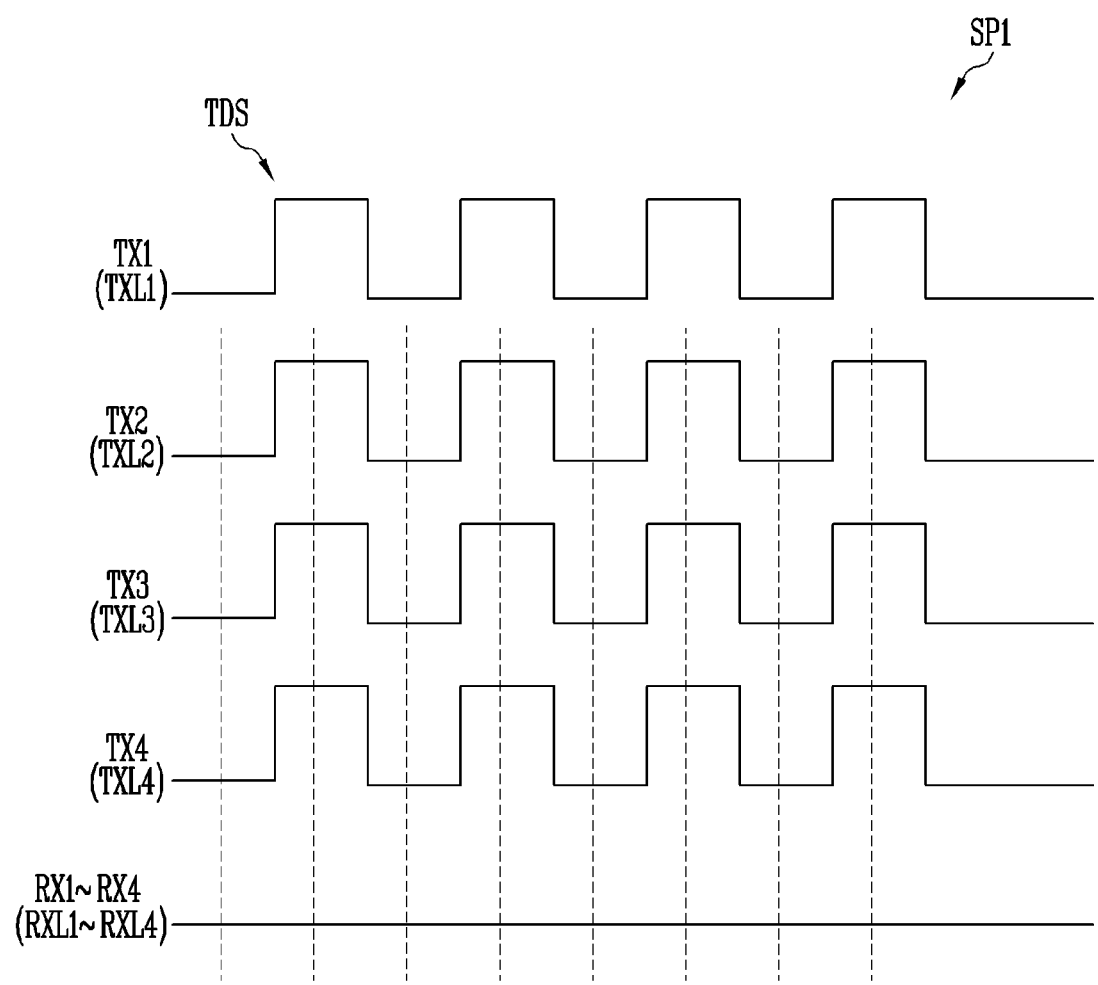
FIGS. 5 and 6 are diagrams illustrating touch driving periods according to embodiments.
Figure 6:
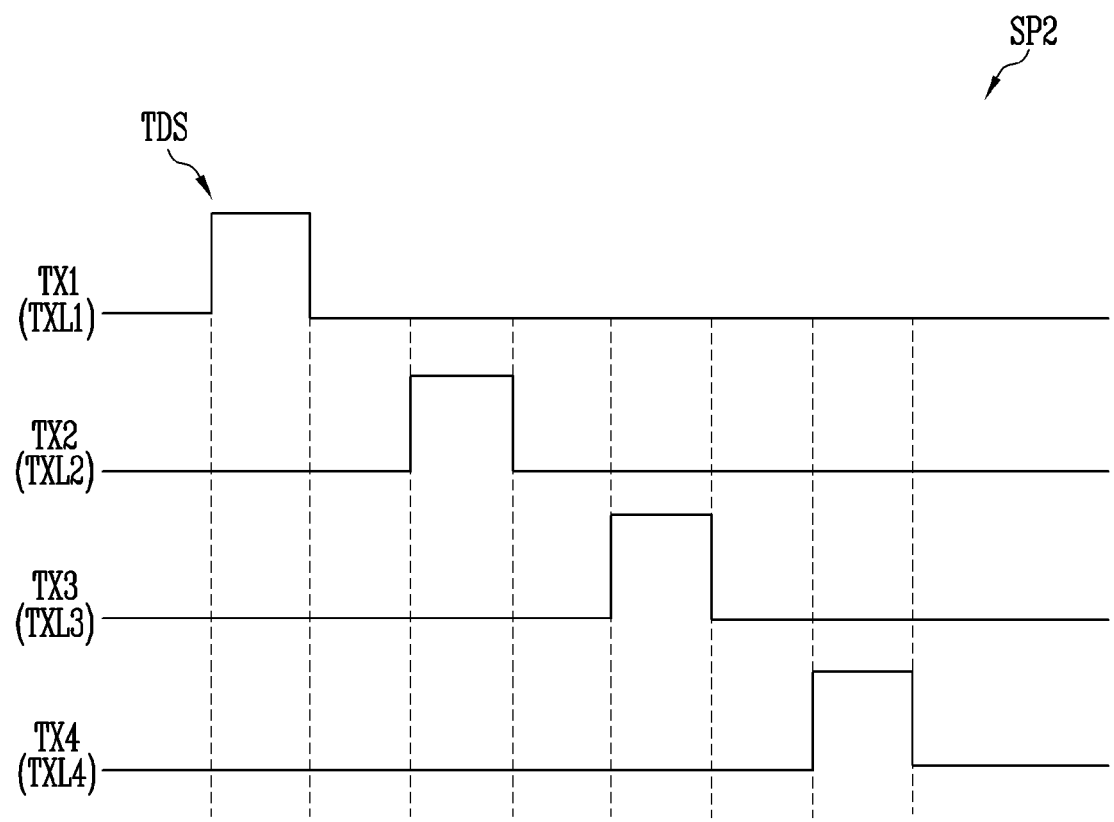

FIG. 3 is a diagram illustrating a display device according to an embodiment. With regard to FIG. 3, content that overlaps with FIG. 1 will be briefly described or omitted. FIG. 4 is a diagram illustrating a display driving period and a touch driving period according to an embodiment. FIGS. 5 and 6 are diagrams illustrating touch driving periods according to embodiments.

Referring to FIG. 3, the display driver 210 may supply signals for display driving of the display device 1 to the display unit 110 during a display driving period DP (see FIG. 4). The display driver 210 may supply a data signal DATA to the plurality of data lines DL. The display driver 210 may supply a plurality of scan signals GW, GB, and GI to the plurality of scan lines SL. For example, the display driver 210 may supply a first scan signal GW to a first scan line GWL, a second scan signal GI to a second scan line GIL, and a third scan signal GB to a third scan line GBL (see FIG. 7). The display driver 210 may supply an emission control signal EM to the plurality of emission control lines EML (see FIG. 7).

The sensor unit 120 may include a plurality of driving electrodes TX1, TX2, TX3, and TX4 arranged in the sensing area SA. In the embodiment of FIG. 3, a plurality of first driving electrodes TX1 may be arranged in a second column, a plurality of second driving electrodes TX2 may be arranged in a fourth column, a plurality of third driving electrodes TX3 may be arranged in a sixth column, and a plurality of fourth driving electrodes TX4 may be arranged in an eighth column. The plurality of first driving electrodes TX1, TX2, TX3, and TX4 may be arranged in the first row, third row, fifth row, seventh row, and ninth row. However, the number and arrangement of driving electrodes TX (see FIG. 1) are not limited thereto.

The plurality of driving electrodes TX1, TX2, TX3, and TX4 may be connected to a plurality of driving lines TXL1, TXL2, TXL3, and TXL4. For example, the plurality of first driving electrodes TX1 may be connected to a first driving line TXL1, the plurality of second driving electrodes TX2 may be connected to a second driving line TXL2, the plurality of third driving electrodes TX3 may be connected to a third driving line TXL3, and the plurality of fourth driving electrodes TX4 may be connected to a fourth driving line TXL4. Accordingly, the plurality of driving electrodes TX1, TX2, TX3, and TX4 may be connected to the sensor driver 220 through the plurality of driving lines TXL1, TXL2, TXL3, and TXL4.

The sensor unit 120 may include a plurality of sensing electrodes RX1, RX2, RX3, and RX4 arranged in the sensing area SA. In the embodiment of FIG. 3, a plurality of first sensing electrodes RX1 may be arranged in a second row, a plurality of second sensing electrodes RX2 may be arranged in a fourth row, a plurality of third sensing electrodes RX3 may be arranged in a sixth row, and a plurality of fourth sensing electrodes RX4 may be arranged in an eighth row. The plurality of sensing electrodes RX1, RX2, RX3 and RX4 may be arranged in the first column, third column, fifth column, seventh column, and ninth column. That is, the plurality of sensing electrodes RX1, RX2, RX3, and RX4 may be arranged to intersect the plurality of driving electrodes TX1, TX2, TX3, and TX4. However, the number and arrangement of sensing electrodes RX (see FIG. 1) are not limited thereto.

The plurality of sensing electrodes RX1, RX2, RX3, and RX4 may be connected to a plurality of sensing lines RXL1, RXL2, RXL3, and RXL4. For example, the plurality of first sensing electrodes RX1 may be connected to a first sensing line RXL1, the plurality of second sensing electrodes RX2 may be connected to a second sensing line RXL2, the plurality of third sensing electrode RX3 may be connected to a third sensing line RXL3, and the plurality of fourth sensing electrodes RX4 may be connected to a fourth sensing line RXL4. Accordingly, the plurality of sensing electrodes RX1, RX2, RX3, and RX4 may be connected to the sensor driver 220 through the plurality of sensing lines RXL1, RXL2, RXL3, and RXL4.

The sensor driver 220 may supply a touch driving signal TDS to the plurality of driving lines TXL1, TXL2, TXL3, and TXL4 during a touch driving period SP (see FIG. 4). The touch driving signal TDS may be supplied to the plurality of driving electrodes TX1, TX2, TX3, and TX4 through the plurality of driving lines TXL1, TXL2, TXL3, and TXL4.

Referring to FIG. 5, in an embodiment, the sensor driver 220 may simultaneously supply the touch driving signal TDS to the plurality of driving electrodes TX1, TX2, TX3, and TX4 during a first touch driving period SP1. In this case, the plurality of sensing electrodes RX1, RX2, RX3, and RX4 may receive a separate reference signal (for example, a ground voltage) or may be in a floating state. The plurality of driving electrodes TX1, TX2, TX3, and TX4 may have self-capacitance. In this case, when a touch input by a user or the like approaches the plurality of driving electrodes TX1, TX2, TX3, and TX4, the self-capacitance of the plurality of driving electrodes TX1, TX2, TX3, and TX4 may be changed depending on the capacitance formed by the user or the like. A driving signal reflecting the self-capacitance may be referred to as the touch sensing signal. The location of the touch input by the user or the like may be detected using a difference in touch sensing signals for the plurality of driving electrodes TX1, TX2, TX3, and TX4. As such, the first touch driving period SP1 may be a period in which the sensor unit 120 and the sensor driver 220 are driven in a self-capacitance mode.

Referring to FIG. 6, in an embodiment, the sensor driver 220 may sequentially supply the touch driving signal TDS to the plurality of driving electrodes TX1, TX2, TX3, and TX4 during a second touch driving period SP2. The plurality of sensing electrodes RX1, RX2, RX3, and RX4 may receive the touch sensing signal corresponding to the touch driving signal TDS. In the sensing area SA, mutual capacitance between the plurality of driving electrodes TX1, TX2, TX3, and TX4 and the plurality of sensing electrodes RX1, RX2, RX3, and RX4 may vary depending on the location of the touch input by the user or the like. Accordingly, touch sensing signals received by the plurality of sensing electrodes RX1, RX2, RX3, and RX4 may be different from each other. Using this difference in touch sensing signals, the location of the touch input by the user or the like can be detected. As such, the second touch driving period SP2 may be a period in which the sensor unit 120 and the sensor driver 220 are driven in a mutual capacitance mode.

The power supply 30 may supply power source signals for display driving of the display device 1 to the display unit 110 during the display driving period DP (see FIG. 4). For example, the power supply 30 may supply a first power source voltage ELVSS to a first power source line ELVSSL. In addition, the power supply 30 may supply an initialization voltage AINT to an initialization line IL. In addition, the power supply 30 may supply a second power source voltage ELVDD to a second power source line ELVDDL (see FIG. 7).

Referring to FIG. 4, the display driving period DP in which the display device 1 operates in the display driving mode that displays an image and the touch driving period SP in which the display device 1 operates in the touch driving mode that senses a touch input from a user may overlap with each other. For example, the touch driving period SP may overlap with at least a portion of the display driving period DP. When the display driving period DP and the touch driving period SP overlap with each other, image quality may deteriorate due to the effect of touch driving on display driving. In particular, since the display unit 110 and the sensor unit 120 are disposed close to each other (see FIG. 2), the deterioration of image quality due to the touch driving may worsen.

In an embodiment, the display device 1 may further include a compensation circuit 40. The compensation circuit 40 may be disposed between the plurality of driving lines TXL1, TXL2, TXL3, and TXL4 and the initialization line IL. The compensation circuit 40 may prevent the deterioration of image quality due to overlap between the touch driving and the display driving. For example, the compensation circuit 40 may change the initialization voltage AINT in response to a change in the first power source voltage ELVSS caused by the effect of the touch driving signal TDS. The specific structure and function of the compensation circuit 40 will be described later with reference to FIGS. 11 and 12.

Figure 7:
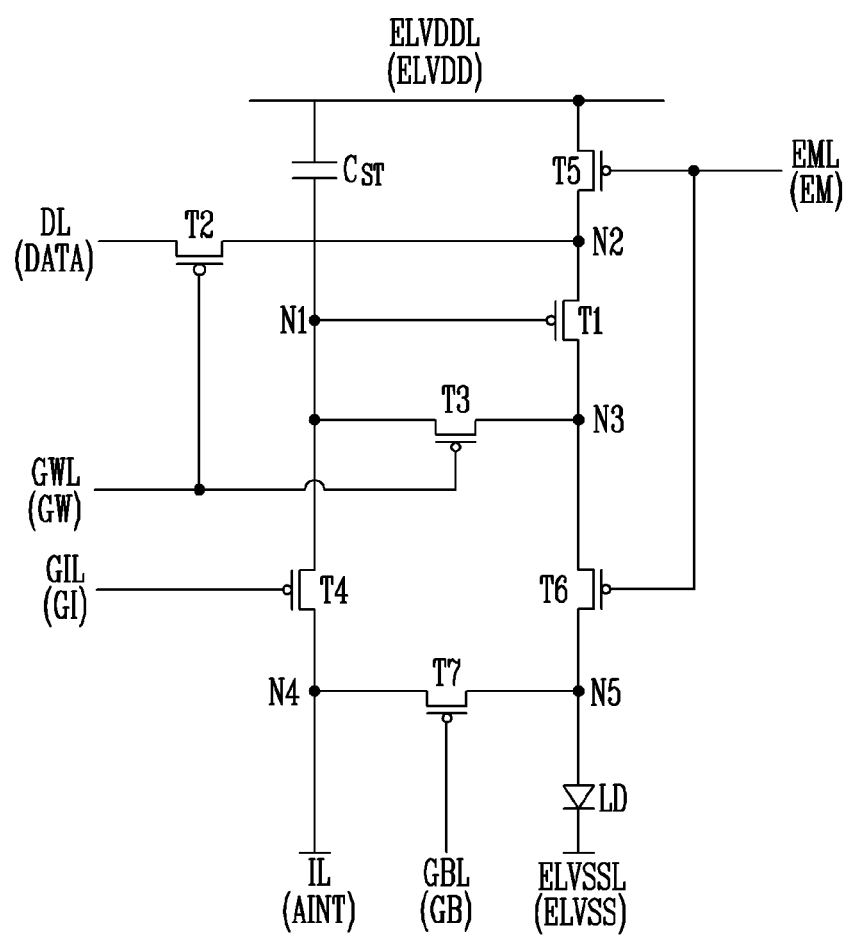
FIG. 7 is a diagram illustrating a pixel according to an embodiment.

FIG. 7 is a diagram illustrating a pixel according to an embodiment.

Referring to FIG. 7, a pixel PX may include a first transistor T1, a second transistor T2, a third transistor T3, a fourth transistor T4, a fifth transistor T5, a sixth transistor T6, a seventh transistor T7, a storage capacitor CST, and a light emitting element LD.

The first transistor T1 may include a gate electrode connected to a first node N1, a first electrode connected to a second node N2, and a second electrode connected to a third node N3. The first transistor T1 may be connected between the second node N2 and the third node N3, and the gate electrode may be connected to the first node N1 to control a driving current. The first transistor T1 may generate the driving current in response to the data signal DATA.

The second transistor T2 may include a gate electrode that receives the first scan signal GW, a first electrode that receives the data signal DATA, and a second electrode connected to the second node N2. The second transistor T2 may be connected between the data line DL and the second node N2 and the gate electrode may be connected to the first scan line GWL. The second transistor T2 may provide the data signal DATA to the second node N2 in response to the first scan signal GW.

The third transistor T3 may include a gate electrode that receives the first scan signal GW, a first electrode connected to the first node N1, and a second electrode connected to the third node N3. The third transistor T3 may be connected between the first node N1 and the third node N3 and the gate electrode may be connected to the first scan line GWL. When the third transistor T3 is turned on, the first transistor T1 may be connected in the form of a diode.

The fourth transistor T4 may include a gate electrode that receives the second scan signal GI, a first electrode connected to the first node N1, and a second electrode that receives the initialization voltage AINT. The fourth transistor T4 may be connected between the first node N1 and the initialization line IL (or the fourth node N4) and the gate electrode may be connected to the second scan line GIL. The fourth transistor T4 may provide the initialization voltage AINT to the first node N1 in response to the second scan signal GI.

The fifth transistor T5 may include a gate electrode that receives the emission control signal EM, a first electrode that receives the second power source voltage ELVDD, and a second electrode connected to the second node N2. The fifth transistor T5 may be connected between the second power source line ELVDDL and the second node N2 and the gate electrode may be connected to the emission control line EML. The fifth transistor T5 may provide the second power source voltage ELVDD to the second node N2 in response to the emission control signal EM.

The sixth transistor T6 may include a gate electrode that receives the emission control signal EM, a first electrode connected to the third node N3, and a second electrode connected to a fifth node N5. The sixth transistor T6 may be connected between the third node N3 and the fifth node N5 and the gate electrode may be connected to the emission control line EML. The sixth transistor T6 may provide a voltage of the third node N3 to the fifth node N5 in response to the emission control signal EM.

The seventh transistor T7 may include a gate electrode that receives the third scan signal GB, a first electrode that receives the initialization voltage AINT, and a second electrode connected to the fifth node N5. The seventh transistor T7 may be connected between the initialization line IL and the fifth node N5 and the gate electrode may be connected to the third scan line GBL. The seventh transistor T7 may provide the initialization voltage AINT to the anode electrode (or the fifth node N5) of the light emitting element LD in response to the third scan signal GB.

The light emitting element LD may include the anode electrode connected to the fifth node N5 and a cathode electrode receiving the first power source voltage ELVSS. The light emitting element LD may be connected between the fifth node N5 and the first power source line ELVSSL. The light emitting element LD may emit light based on the driving current transmitted through the first transistor T1.

Figure 8:
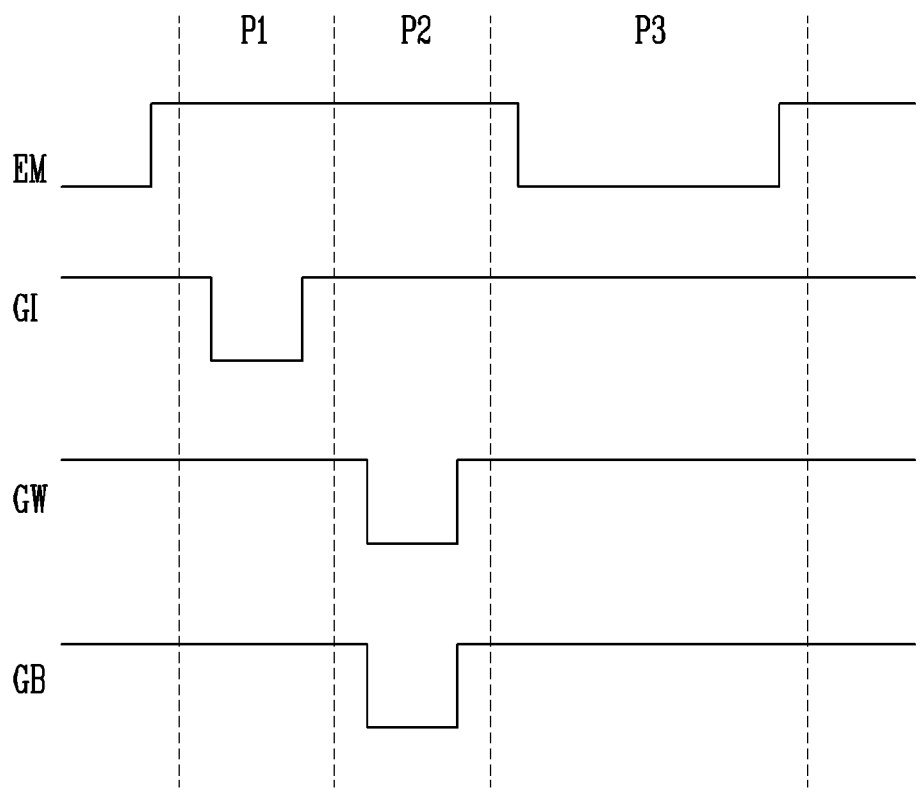
FIG. 8 is a diagram illustrating an operation of the pixel shown in FIG. 7.

FIG. 8 is a diagram illustrating an operation of the pixel shown in FIG. 7.

Referring to FIG. 8, the pixel PX (see FIG. 7) may operate in a first section P1 in which the gate electrode of the first transistor T1 is initialized, a second section P2 in which the data signal DATA compensated by a threshold voltage is written and anode electrode of the light emitting element LD is initialized, and a third section P3 in which the light emitting element LD emits light.

During the first section P1, the fourth transistor T4 may be turned on and the initialization voltage AINT may be applied to the first node N1 to initialize the gate electrode of the first transistor T1.

During the second section P2, the second transistor T2 and the third transistor T3 may be turned on to supply the data signal DATA to the first node N1, and the first transistor T1 may be connected in the form of a diode as the third transistor T3 is turned on. Accordingly, the data signal DATA compensated by the threshold voltage of the first transistor T1 may be stored in the storage capacitor CST. In addition, during the second section P2, the seventh transistor T7 may be turned on and the initialization voltage AINT may be applied to the anode electrode of the light emitting element LD to initialize the anode electrode.

During the third section P3, the fifth transistor T5 and the sixth transistor T6 may be turned on so that the driving current generated in the first transistor T1 may flow to the light emitting element LD. Accordingly, the light emitting element LD may emit light with a luminance corresponding to the driving current.

Figure 9:
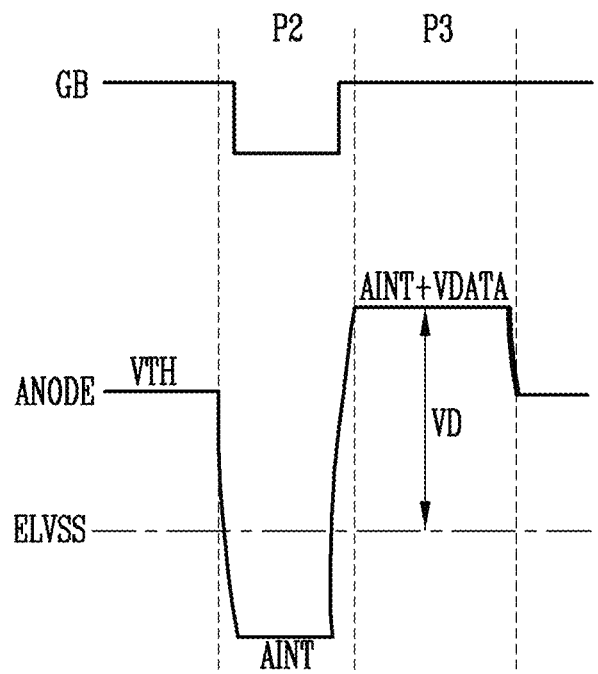
FIG. 9 is a diagram illustrating an example of display driving.
Figure 10:
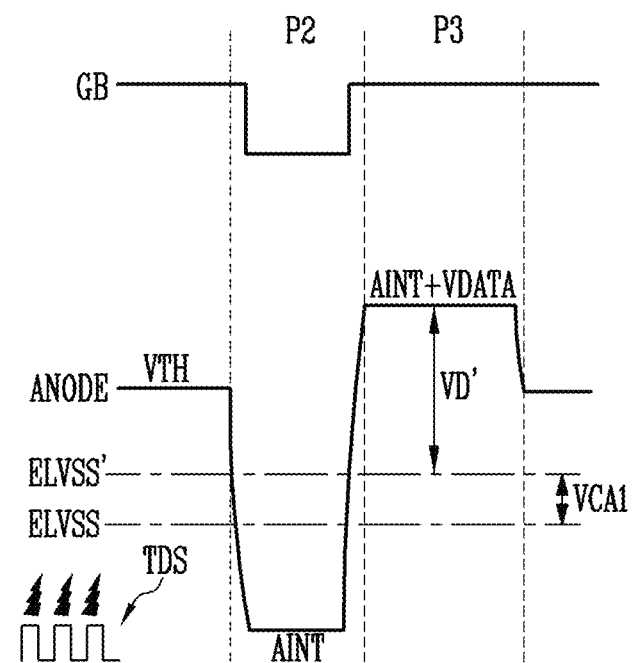
FIG. 10 is a diagram illustrating an example of display driving affected by touch driving.

FIG. 9 is a diagram illustrating an example of display driving. FIG. 10 is a diagram illustrating an example of display driving affected by touch driving.

Referring to FIG. 9, during the second section P2, as the third scan signal GB is applied to the seventh transistor T7 (see FIG. 7), an anode voltage ANODE of the light emitting element LD (see FIG. 7) may be initialized to the initialization voltage AINT. For example, the anode voltage ANODE of the light emitting element LD may be reduced from a threshold voltage VTH of the light emitting element LD to the initialization voltage AINT.

During the third section P3, as the driving current flows to the light emitting element LD, the anode voltage ANODE of the light emitting element LD may increase. For example, the anode voltage ANODE of the light emitting element LD may increase by a voltage VDATA corresponding to the data signal DATA.

When the touch driving does not affect the display driving, the first power source voltage ELVSS may be maintained constant. Accordingly, the light emitting element LD may emit light with a luminance corresponding to a difference VD between the anode voltage ANODE and the first power source voltage ELVSS.

Referring to FIG. 10, when the touch driving affects the display driving, the first power source voltage ELVSS may be changed. For example, the touch drive signal TDS provided during the touch driving may affect the first power source voltage ELVSS, so that the first power source voltage ELVSS may increase by the amount of change VCA1. Accordingly, since the light emitting element LD emits light with an unwanted luminance corresponding to a difference VD' between the anode voltage ANODE and the changed first power source voltage ELVSS', image quality may deteriorate. For example, horizontal lines may be visible in images.

Figure 11:
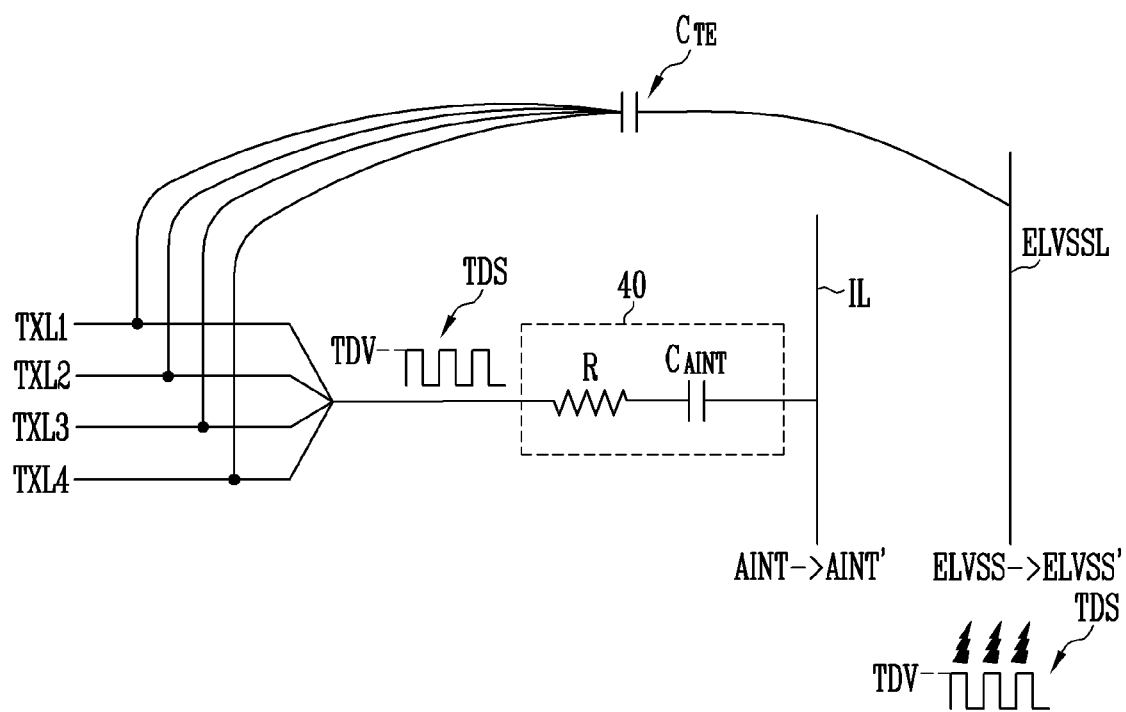
FIG. 11 is a diagram illustrating a compensation circuit according to an embodiment.
Figure 12:
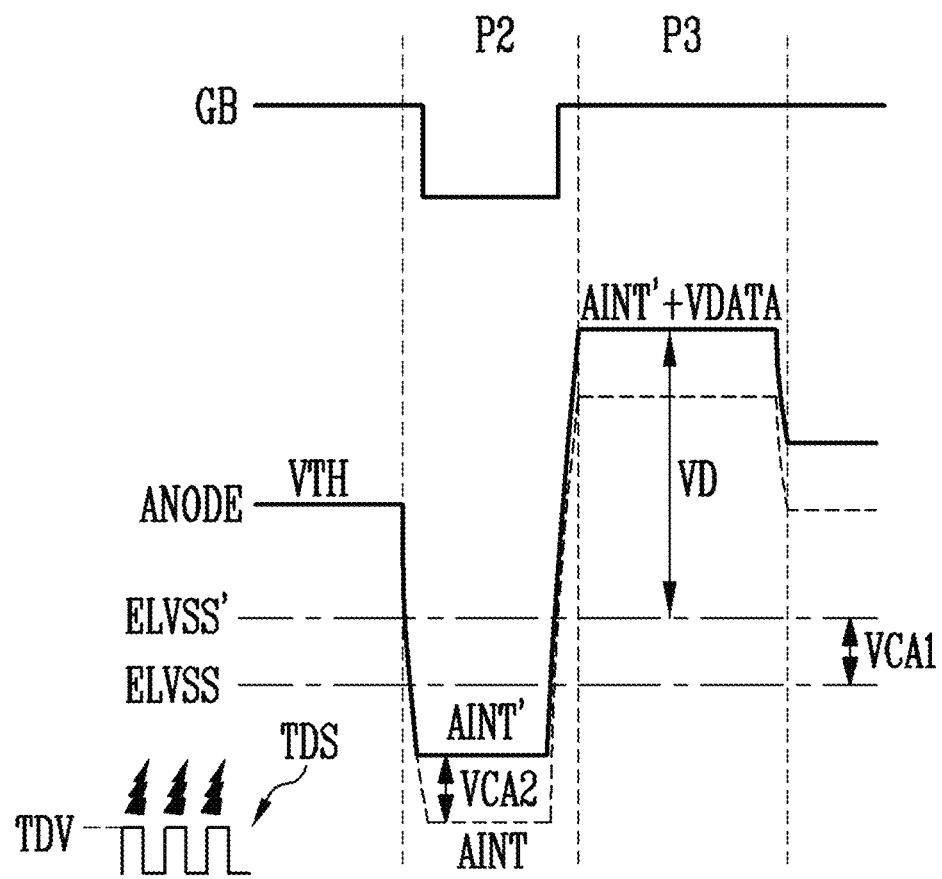
FIG. 12 is a diagram illustrating an example of display driving affected by touch driving when the compensation circuit is applied.

FIG. 11 is a diagram illustrating a compensation circuit according to an embodiment. FIG. 12 is a diagram illustrating an example of display driving affected by touch driving when the compensation circuit is applied.

Referring to FIG. 11, the compensation circuit 40 may include a resistor R and a compensation capacitor CAINT connected in series between the plurality of driving lines TXL1, TXL2, TXL3, and TXL4 and the initialization line IL. The resistor R may refer to the resistance of lines constituting the compensation circuit 40.

The compensation capacitor CAINT may be a component for changing the initialization voltage AINT by the amount of change in the first power source voltage ELVSS. That is, the amount of change in the initialization voltage AINT by the compensation capacitor CAINT may be equal to the amount of change in the first power source voltage ELVSS caused by the effect of the touch driving signal TDS. In this case, the amount of change in the first power source voltage ELVSS may be derived based on a capacitor CTE formed between the plurality of driving lines TXL1, TXL2, TXL3, and TXL4 and the first power source line ELVSSL. For example, the first power source voltage ELVSS may increase based on the amount of electric charge (in Coulombs) corresponding to a product of the capacitance of the capacitor CTE and a touch driving voltage TDV of the touch driving signal TDS. That is, the first power source voltage ELVSS may be changed to an increased first power source voltage ELVSS' due to the coupling effect of the capacitor CTE formed between the plurality of driving lines TXL1, TXL2, TXL3, and TXL4 and the first power source line ELVSSL.

The capacitance of the compensation capacitor CAINT may be equal to the capacitance of the capacitor CTE formed between the plurality of driving lines TXL1, TXL2, TXL3, and TXL4 and the first power source line ELVSSL. Since parasitic capacitors (not shown) are formed in parallel between each of the plurality of driving lines TXL1, TXL2, TXL3, and TXL4 and the first power source line ELVSSL, the capacitance of the capacitor CTE may be derived as a product of the number of the plurality of driving lines TXL1, TXL2, TXL3, and TXL4 and the capacitance of the parasitic capacitor (not shown). The capacitance of the parasitic capacitor (not shown) may vary depending on the design of the plurality of driving lines TXL1, TXL2, TXL3, and TXL4 and the first power source line ELVSSL.

The initialization voltage AINT may increase by the amount of charge corresponding to a product of the capacitance of the compensation capacitor CAINT and the touch driving voltage TDV of the touch driving signal TDS. That is, due to the coupling effect of the compensation capacitor CAINT formed between the plurality of driving lines TXL1, TXL2, TXL3, and TXL4 and the initialization line IL, the initialization voltage AINT may be changed to an increased initialization voltage AINT'. In particular, the initialization voltage AINT may be changed by the amount of change in the first power source voltage ELVSS caused by the effect of the touch driving signal TDS.

Referring to FIGS. 11 and 12, as the compensation circuit 40 is disposed between the plurality of driving lines TXL1, TXL2, TXL3, and TXL4 and the initialization line IL, during the second section P2, the anode voltage ANODE of the light emitting element LD (see FIG. 7) may be initialized to a changed initialization voltage AINT'. In this case, the anode voltage ANODE of the light emitting element LD may be initialized to the initialization voltage AINT' that is increased by the amount of change VCA2 equal to the amount of change VCA1 in the first power source voltage ELVSS caused by the effect of the touch drive signal TDS.

During the third section P3, since the anode voltage ANODE of the light emitting element LD increases by a voltage VDATA corresponding to the data signal DATA from the initialization voltage AINT' increased in the second section P2, the anode voltage ANODE of the light emitting element LD may be maintained at a higher voltage. During the third section P3, the anode voltage ANODE of the light emitting element LD may be maintained at a voltage increased by the amount of change VCA2 in the initialization voltage AINT. In this case, since the amount of change VCA2 in the initialization voltage AINT and the amount of change VCA1 in the first power source voltage ELVSS are the same, the light emitting element LD may emit light with a luminance corresponding to the difference VD between the changed anode voltage AINT'+VDATA and the changed first power source voltage ELVSS'. That is, since the voltage (that is, the difference VD) applied to the light emitting element LD is maintained constant despite the change in the first power source voltage ELVSS caused by the touch driving, the deterioration of image quality can be prevented.

As described above, the compensation circuit 40 may change the initialization voltage AINT by the amount of change in the first power source voltage ELVSS caused by the touch driving signal TDS, thereby preventing the deterioration of image quality due to overlap between the touch driving and the display driving.

According to the embodiments of the present disclosure, a display device that can prevent deterioration of image quality due to the effect of touch driving on display driving can be provided.

However, effects of the present disclosure are not limited to the above-described effects, and may be variously extended without departing from the spirit and scope of the present disclosure.

Although the present disclosure has been specifically described according to the above-described embodiments, it should be noted that the above-described embodiments are intended to illustrate the present disclosure and not to limit the scope of the present disclosure. Those of ordinary skill in the art to which the present disclosure pertains will understand that various modifications are possible within the scope of the technical spirit of the present disclosure.

Therefore, the technical protection scope of the present disclosure is not limited to the detailed description described in the specification, but should be determined by the appended claims. In addition, all changes or modifications derived from the meaning and scope of the claims and their equivalents should be construed as being included in the scope of the present disclosure. The embodiments may be combined to form additional embodiments.

What is claimed is:

1. A display device comprising:
a display unit including a plurality of pixels connected to an initialization line and a first power source line;
a sensor unit provided on the display unit and including a plurality of driving electrodes;
a sensor driver providing a touch driving voltage to a plurality of driving lines connected to the plurality of driving electrodes;
a power supply providing an initialization voltage to the initialization line and providing a first power source voltage to the first power source line; and
a compensation circuit compensating for the initialization voltage, wherein the compensation circuit is connected between the plurality of driving lines and the initialization line.

2. The display device of claim 1, wherein the compensation circuit changes the initialization voltage in response to a change in the first power source voltage.

3. The display device of claim 2, wherein the compensation circuit includes a resistor and a compensation capacitor connected in series.

4. The display device of claim 3, wherein a capacitance of the compensation capacitor is the same as a capacitance of a capacitor formed between the plurality of driving lines and the first power source line.

5. The display device of claim 4, wherein the initialization voltage is changed by an amount of charge corresponding to a product of the capacitance of the compensation capacitor and the touch driving voltage.

6. The display device of claim 5, wherein the amount of change in the initialization voltage is the same as the amount of change in the first power source voltage.

7. A display device comprising:
a display unit including a plurality of pixels connected to an initialization line and a first power source line;
a sensor unit provided on the display unit and including a plurality of driving electrodes;
a sensor driver providing a touch driving voltage to a plurality of driving lines connected to the plurality of driving electrodes;

a power supply providing an initialization voltage to the initialization line and providing a first power source voltage to the first power source line; and a compensation circuit compensating for the initialization voltage;

wherein each of the plurality of pixels includes:

a first transistor including a gate electrode connected to a first node, a first electrode connected to a second node, and a second electrode connected to a third node;

a second transistor including a gate electrode connected to a first scan line, a first electrode connected to a data line, and a second electrode connected to the second node;

a third transistor including a gate electrode connected to the first scan line, a first electrode connected to the first node, and a second electrode connected to the third node;

a fourth transistor including a gate electrode connected to a second scan line, a first electrode connected to a fourth node that is the initialization line, and a second electrode connected to the first node;

a fifth transistor including a gate electrode connected to an emission control line, a first electrode connected to a second power source line, and a second electrode connected to the second node;

a sixth transistor including a gate electrode connected to the emission control line, a first electrode connected to the third node, and a second electrode connected to a fifth node;

a seventh transistor including a gate electrode connected to a third scan line, a first electrode connected to the initialization line, and a second electrode connected to the fifth node; and a light emitting element including an anode electrode connected to the fifth node and a cathode electrode connected to the first power source line.

8. The display device of claim 7, wherein the anode electrode is initialized to a compensated initialization voltage in response to the seventh transistor being turned on.

9. The display device of claim 1, wherein the sensor unit further includes a plurality of sensing electrodes, and wherein the sensor driver receives a sensing voltage from a plurality of sensing lines connected to the plurality of sensing electrodes.

10. A display device operating in a display driving period and a touch driving period overlapping with at least a portion of the display driving period, comprising:

a plurality of driving lines connected to a plurality of driving electrodes;

a first power source line connected to a cathode electrode of a light emitting element;

an initialization line providing an initialization voltage to an anode electrode of the light emitting element; and a compensation circuit connected between the plurality of driving lines and the initialization line.

11. The display device of claim 10, wherein the compensation circuit includes a resistor and a compensation capacitor connected in series.

12. The display device of claim 11, wherein a capacitance of the compensation capacitor is the same as a capacitance of a capacitor formed between the plurality of driving lines and the first power source line.

13. The display device of claim 12, wherein the compensation circuit changes the initialization voltage based on a touch driving voltage provided to the plurality of driving lines during the touch driving period.

14. The display device of claim 13, wherein the initialization voltage is changed based on an amount of charge corresponding to a product of the capacitance of the compensation capacitor and the touch driving voltage.

15. The display device of claim 14, wherein the amount of change in the initialization voltage is the same as the amount of change in a first power source voltage provided to the first power source line.

16. The display device of claim 7, wherein the sensor unit further includes a plurality of sensing electrodes, and wherein the sensor driver receives a sensing voltage from a plurality of sensing lines connected to the plurality of sensing electrodes.

* * * * *